US006453072B1

United States Patent
Hatakenaka

(10) Patent No.: US 6,453,072 B1
(45) Date of Patent: Sep. 17, 2002

(54) IMAGE CODING SYSTEM

(75) Inventor: Akira Hatakenaka, Hino (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/168,295

(22) Filed: Oct. 8, 1998

(30) Foreign Application Priority Data

Oct. 9, 1997 (JP) .............................................. 9-277585

(51) Int. Cl.[7] .................................................. G06K 9/36
(52) U.S. Cl. .................................... 382/232; 358/262.1
(58) Field of Search ................................ 382/232, 233, 382/235, 245, 246; 358/261.1, 427, 261.3, 262.1

(56) References Cited

U.S. PATENT DOCUMENTS

| | | | | |
|---|---|---|---|---|
| 5,384,665 A | * | 1/1995 | Ohkuma | 360/22 |
| 6,018,366 A | * | 1/2000 | Asai | 348/394 |
| 6,134,663 A | * | 10/2000 | Nakamura | 713/201 |
| 6,148,141 A | * | 11/2000 | Maeda | 386/112 |

* cited by examiner

Primary Examiner—Jerome Grant, II
(74) Attorney, Agent, or Firm—Pillsbury Winthrop LLP

(57) ABSTRACT

An image coding system includes an optical system 1, an image pick-up unit 2, a color space/pixel number converting unit 4, an orthogonal converting unit 5, a quantizing unit 6, a variable run length coding unit 7 and a storing/transmitting unit 10. The system further includes a code volume control unit 8 for providing, in a first coding process, image data obtained from the color space/pixel number converting unit 4 as a result of omission of at least the color space conversion, among the color space and pixel number conversions, to the orthogonal conversion unit 5, and computing quantizing coefficient data adequate for obtaining a target code volume from the code volume of coded data provided from the orthogonal converting unit 5 and the target code volume. In a second coding process, the color space/pixel number converting unit 4 executes both of the color space and pixel number conversions and provides resultant image data to the orthogonal converting unit 5 or storage and/or transmission of coded data provided as a result from the orthogonal converting unit 5.

9 Claims, 3 Drawing Sheets

FIG. 2

| R00 | G01 | R02 | G03 | R04 | G05 | R06 | G07 | R08 | G09 | R0A | G0B | R0C | G0D | R0E | G0F |
| G10 | B11 | G12 | B13 | G14 | B15 | G16 | B17 | G18 | B19 | G1A | B1B | G1C | B1D | G1E | B1F |
| R20 | G21 | R22 | G23 | R24 | G25 | R26 | G27 | R28 | G29 | R2A | G2B | R2C | G2D | R2E | G2F |
| G30 | B31 | G32 | B33 | G34 | B35 | G36 | B37 | G38 | B39 | G3A | B3B | G3C | B3D | G3E | B3F |
| R40 | G41 | R42 | G43 | R44 | G45 | R46 | G47 | R48 | G49 | R4A | G4B | R4C | G4D | R4E | G4F |
| G50 | B51 | G52 | B53 | G54 | B55 | G56 | B57 | G58 | B59 | G5A | B5B | G5C | B5D | G5E | B5F |
| R60 | G61 | R62 | G63 | R64 | G65 | R66 | G67 | R68 | G69 | R6A | G6B | R6C | G6D | R6E | G6F |
| G70 | B71 | G72 | B73 | G74 | B75 | G76 | B77 | G78 | B79 | G7A | B7B | G7C | B7D | G7E | B7F |

FIG. 3

| G01 | G03 | G05 | G07 | G09 | G0B | G0D | G0F |
|---|---|---|---|---|---|---|---|
| G10 | G12 | G14 | G16 | G18 | G1A | G1C | G1E |
| G21 | G23 | G25 | G27 | G29 | G2B | G2D | G2F |
| G30 | G32 | G34 | G36 | G38 | G3A | G3C | G3E |
| G41 | G43 | G45 | G47 | G49 | G4B | G4D | G4F |
| G50 | G52 | G54 | G56 | G58 | G5A | G5C | G5E |
| G61 | G63 | G65 | G67 | G69 | G6B | G6D | G6F |
| G70 | G72 | G74 | G76 | G78 | G7A | G7C | G7E |

FIG. 4

| R00 | R02 | R04 | R06 | R08 | R0A | R0C | R0E |
|---|---|---|---|---|---|---|---|
| R20 | R22 | R24 | R26 | R28 | R2A | R2C | R2E |
| R40 | R42 | R44 | R46 | R48 | R4A | R4C | R4E |
| R60 | R62 | R64 | R66 | R68 | R6A | R6C | R6E |

FIG. 5

| B11 | B13 | B15 | B17 | B19 | B1B | B1D | B1F |
|---|---|---|---|---|---|---|---|
| B31 | B33 | B35 | B37 | B39 | B3B | B3D | B3F |
| B51 | B53 | B55 | B57 | B59 | B5B | B5D | B5F |
| B71 | B73 | B75 | B77 | B79 | B7B | B7D | B7F |

IMAGE CODING SYSTEM

BACKGROUND OF THE INVENTION

The present invention relates to image coding systems and, more particularly, to image coding systems for compressing and coding the digital image signal obtained by digital cameras or like electronic cameras.

Recently, digital cameras or like electronic cameras (hereinafter referred to as digital cameras) are popular, which uses a photoelectric transducer for photoelectrically converting images optically focused by an optical system of a photographing lens system or the like to an electric signal as image signal (or image data) which is A/D converted to a digital image signal for recording (or storage).

When the image data is digitized, usually an enormous amount of data is produced compared to character data or the like. To record (or store) and transmit such great amount of digital image data at an adequate processing rate, a large scale circuit requiring high cost of manufacture is necessary. Accordingly, data compression techniques for compressing the image data to be stored or transmitted, thus reducing the data size, find extensive applications particularly to digital cameras and like small-size devices dealing with the image data, which importance is attached to the portability size and cost reduction is required for.

In the usual digital camera, normally the image data to be stored or transmitted is compressed and coded in the following process. Image which is focused optically by an optical system is photoelectrically converted by a photoelectric transducer or like device to generate image data, which is in turn A/D converted to digital image data. This digital data is divided into a plurality of predetermined unit blocks each comprising, for instance, 8×8 pixels, and orthogonally converted for each block by means of DCT (discrete cosine transform) involving DCT computation. Further, DCT coefficients which are obtained as a result of the orthogonal conversion are quantized, and the quantized DCT coefficients are subjected to variable run length coding such as Huffman coding.

In this case, commonly called two-pass coding volume control is executed for the coding. Specifically, in a first coding process quantizing coefficients are obtained such that the image data amount is a target code volume and in a second coding process the quantization process is executed on the basis of thus obtained quantizing coefficients.

However, in the above coding under the two-pass code volume control, two similar coding processes are executed on the image data obtained through the optical system, and the overall process thus requires long processing time.

Besides, so long as the image data obtained through the optical system and photoelectrically and A/D converted is color space converted and pixel number converted in each of the two coding processes, a great amount of data is involved, reducing processing speed.

SUMMARY OF THE INVENTION

The present invention was made in view of the above problems, and it has an object of providing an image coding system capable of fast coding process and storing and transmitting of the coded data with less deterioration even when the coding is executed under code volume control of a plurality of passes.

According to a first aspect of the present invention, there is provided an image coding system comprising an image pick-up unit for photoelectrically and then digital-to-analog converting image focused by an optical system, thereby providing digital image data, a color space/pixel number converting unit for converting the digital image data provided from the image pick-up unit to color space and pixel number converted digital image data to be stored and/or transmitted, an orthogonal converting unit for orthogonally converting the digital image data, a quantizing unit for quantizing orthogonal conversion coefficients provided from the orthogonal converting unit, a variable run length coding unit for variable run length coding the quantized orthogonal conversion coefficients from the quantizing unit, and a storing/transmitting unit for storing and/or transmitting the variable run length coded data from the variable run length coding unit, wherein:

the image coding system further comprises a code volume control unit for providing, in a first coding process, image data obtained from the color space/pixel number converting unit as a result of omission of at least the color space conversion, among the color space and pixel number conversions, to the orthogonal converting unit, and computing quantizing coefficient data adequate for obtaining a target code volume from the code volume of coded data provided from the orthogonal converting unit and the target code volume; and in a second coding process executed from an instant of time after the first coding process, the color space/pixel number converting unit executes both of the color space and pixel number conversions and provides resultant image data to the orthogonal converting unit and stores and/or transmitting the coded data provided as a result from the orthogonal converting unit.

Thus, in the image coding system according to the first aspect of the present invention, in the first coding process at least the color space conversion among the color space and pixel number conversions to be executed in the color space/pixel number converting unit is omitted for increasing the coding process speed, while in the second coding process both of the color space and pixel number conversions are not omitted but executed in the color space/pixel number converting unit, thus permitting more efficient storage and/or transmission of coded data with less deterioration.

According to a second aspect of the present invention, there is provided an image coding system comprising an orthogonal converting unit for orthogonally converting digital image data, a quantizing unit for quantizing orthogonal conversion coefficients provided from the orthogonal converting unit, a variable run length coding unit for variable run length coding the quantized orthogonal conversion coefficients from the quantizing unit, and a storing/transmitting unit for storing and/or transmitting the variable run length coded data from the variable run length coding unit, wherein:

the quantizing unit quantizes the orthogonal conversion coefficients on the basis of quantizing coefficient data obtained by multiplying a basic quantization table by a scale factor;

the image coding system further comprises a code volume control unit for determining, in a first coding process, a scale factor used in a second coding process executed from an instant of time after the first coding process on the basis of the ratio between the actual code volume of coded data, obtained by using a predetermined initial scale factor, and a target code volume;

the coded data provided as a result of the second coding process is stored and/or transmitted.

Thus, in the image coding system according to the second aspect of the present invention, in the first coding process the code volume control unit determines the scale factor used in the second coding process on the basis of the ratio between the actual code volume of coded data, obtained by using a predetermined initial scale factor, and a target code volume, the second coding process being executed on the basis of this scale factor for storing and/or transmitting optimum coded data with less deterioration.

According to a third aspect of the present invention, there is provided an image coding system comprising an orthogonal converting unit for orthogonally converting digital image data, a quantizing unit for quantizing orthogonal conversion coefficients provided from the orthogonal converting unit, a variable run length coding unit for variable run length coding the quantized orthogonal conversion coefficients from the quantizing unit, and a storing/transmitting unit for storing and/or transmitting the variable run length coded data from the variable run length coding unit, wherein:

the quantizing unit quantizes the orthogonal conversion coefficients by using quantizing coefficient data obtained by multiplying a basic quantization table by a scale factor;

the image coding system further comprises a code volume control unit for computing, in a first coding process, a scale factor used in a second coding process executed from an instant of time after the first coding process by computing the ratio between the actual code volume obtained with a predetermined initial scale factor, and a target code volume, and then dividing the scale factor used in the first coding process by n-th (n being a positive integer) power of the ratio between the actual and target code volumes;

the coded data provided as a result of the second coding is stored and/or transmitted; and the code volume control unit computes the scale factor used in the second coding process by switching the exponent of the power according to the ratio between the actual and target code volumes.

Thus, in the image coding system according to the third aspect of the present invention, in the first coding system the code volume control unit computes the scale factor used in the second coding process by computing the ratio between the actual code volume, obtained by using a predetermined initial scale factor, and the target code volume and then dividing the scale factor used in the first coding process by n-th (n being a positive integer) power of the ratio between the actual and target code volumes. At this time, the code volume control unit computes the scale factor used in the second coding system by switching the exponent n of the power according to the ratio between the actual and target code volumes, the second coding process being executed according to this scale factor. It is thus possible to obtain more optimum coding and store and/or transmit coded data with less deterioration.

Other objects and features will be clarified from the following description with reference to attached drawings.

BRIEF DESCRIPTION OF THE DRAWINGS

FIG. 2 shows a part of view of color mosaic filter disposed at the light incidence surface of a photoelectric transducer in the image pick-up device shown in FIG. 1; and FIGS. 3 to 5 show the individual rearranged color component, i.e., R, G and B, data in one of a plurality of unit blocks, which is obtained by dividing the whole pixel array of the photoelectric transducer.

PREFERRED EMBODIMENTS OF THE INVENTION

Figure 1:
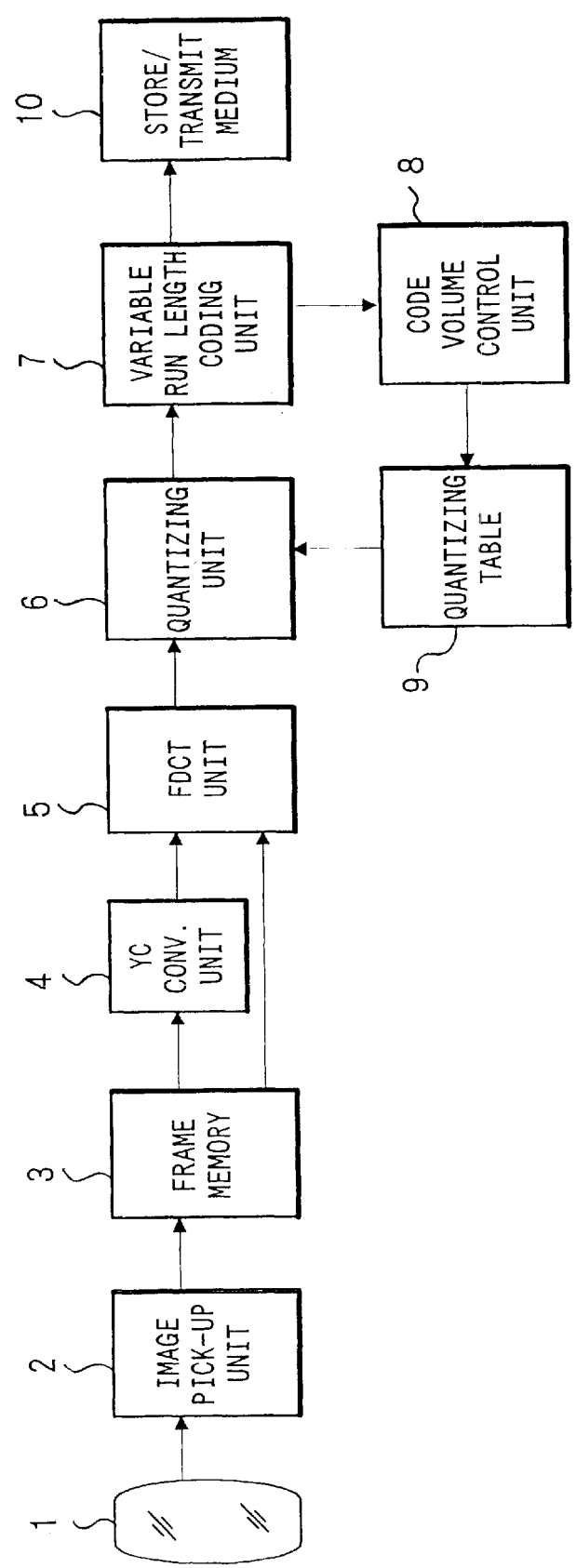
FIG. 1 shows a block diagram showing one embodiment of the image coding system according to the present invention.

Preferred embodiments of the present invention will now be described with reference to the drawings.

FIG. 1 is a block diagram showing one embodiment of the image coding system according to the present invention.

As shown in the Figure, this embodiment of the image coding system comprises an optical system 1, which includes a photographing lens system, for optically focusing images, an image pick-up unit 2, which includes a photoelectric transducer for photoelectrically converting the images optically focused by the optical system 1 to generate an image signal and an A/D (analog-to-digital) converter for A/D converting the image signal from the photoelectric transducer to provide digital image data, a frame memory unit 3 for tentatively storing the digital image data from the image pick-up unit 2, a YC converting unit 4 as color space-pixel number converting unit for converting the image data (RGB composite signal) stored in the frame memory 3 to YC image data as image data of brightness signal and color difference signal (color space converting process) and interpolating the image data (pixel number converting process), an FDCT (Forward DCT) unit 5, which is an orthogonal converting unit for performing such process as DCT (Discrete Cosine Transform) on the image data and serves as pre-processing unit, a quantizing unit 6 for quantizing orthogonal conversion coefficients (DCT coefficients) provided from the FDCT unit 6, a variable run length coding unit 7 for variable run length coding the quantized DCT coefficients from the quantizer 6, code volume control unit 8 for computing the code volume of code data obtained as a result of the variable run length coding in the variable run length coding unit 7 for controlling quantizing coefficients such as to obtain a desired code volume, a quantization table 9, which generates a quantizing coefficient table to be used in the quantizing unit 6 under control of the code volume control unit 8, and a data storing/transmitting medium 10 for storing and/or transmitting the code data provided from the variable run length coding unit 7.

The image pick-up device 2 includes a photoelectric transducer, the light incidence surface of which has a color mosaic filter for generating color image data. The color mosaic filter is constituted by three different color, i.e., R, G and B, filters arranged in a dot array. The dot array is as shown in FIG. 2.

The quantizing unit 6 quantizes the DCT coefficients by using quantizing coefficient data, which is obtained by multiplying the data in the quantization table 9 as basic data by a scale factor (i.e., a parameter for varying the scale of quantization).

The operation of this embodiment of the image coding system having the above construction will now be described.

The image pick-up unit 2 photoelectrically converts optical images, focused by the optical system 1 on its photoelectric transducer to image signal (or image data), which is A/D converted and provided as digital image data. The digital image data is tentatively stored in the frame memory unit 3 for being coded in a process to be described hereinunder. In this embodiment of the image coding system, the image data is coded in a two-pass coding system through two-pass code volume control.

As shown in FIGS. 3 to 5, in a first coding process individual color component data are extracted from the image data stored in the frame memory unit 3, and each of them is rearranged and provided to the FDCT unit 5. The FDCT unit 5 DCT converts the rearranged data. FIGS. 3 to 5 show the individual rearranged color component, i.e., R, G and B, data in one of a plurality of unit blocks, which is obtained by dividing the whole pixel array of the photoelectric transducer, each divided block constituting a predetermined number N×N pixels (N=8 in this embodiment).

The FDCT unit 5 provides DCT coefficients to the quantizing unit 6. The quantizing unit 6 quantizes the DCT coefficients by using quantizing coefficient data in the quantization table 9 for each frequency component. The quantizing table 9 has quantizing coefficient data for each frequency component, and in the first coding process its predetermined basic quantizing coefficient for each frequency component is multiplied by an initial SF (scale factor) to produce the quantizing coefficient data.

The quantized DCT coefficients from the quantizing unit 6 are fed to the variable run length coding unit 7. The run length coding unit 7 variable run length codes the quantized DCT coefficients and provides resultant coded data to the code volume control unit 8. The code volume control unit 8 computes a scale factor (SF) which is used in a second coding process executed subsequent to the first coding process, i.e., a scale factor NSF as a quantizing coefficient, which a target code volume is obtained with, from the computed actual code volume (ACV) and target code volume (TCV) as follows.

First, ratio R0 between ACV and TVC in the first coding process is obtained as:

$$R0 = ACV \times (\alpha / TCV) \quad (1)$$

where $\alpha$ is a correct coefficient (constant) for correcting the input data difference between those in the first and second coding processes. Then, the scale factor NSI used in the second coding process, as given by the following formulas (2) to (4), is obtained from the ratio R0 between ACV and TCV used in the first coding process, given by the formula (1), and scale factor SF used as initial value in the first coding process.

$$NSF = SF / R0^2 \quad (R0 < 1.0) \quad (2)$$

$$= SF / R0^{1.5} \quad (1.0 \leq R0 < 1.6) \quad (3)$$

$$= SF / R0^1 \quad (1.6 \leq R0) \quad (4)$$

In the second coding process, the YC converting unit 4 interpolates the image data stored in the frame memory unit 3 for each color component, and also executes a color space conversion process on the image data. The color space conversion process executes color space conversion of image data as RGB composite signal to image data of luminance signal Y and color difference signals Cr and Cb to the image data (YC conversion process). The YC converted image data is provided to the FDCT unit 5 for DCT conversion process.

The DCT coefficients provided from the FDCT unit 5 are fed to the quantizing unit 6. The quantizing unit 6 quantizes the received DCT coefficients by using the quantizing coefficient data in the quantization table 9 for each frequency component. In the second coding process, the quantizing coefficient data that is used is obtained by multiplying predetermined basic quantizing coefficient data of the quantization table 9 for each frequency component by the scale factor SF which was computed by the code volume control unit 8 in the first coding process.

The quantized DCT coefficients from the quantizer 6 are fed to the variable run length coding unit 7. The variable run length coding unit 7 executes variable run length coding and provides the coded data. The coded data from the variable run length coding unit 7 is fed to the storing/transmitting medium 10 for storage or transmission.

In the above embodiment, the interpolating processes on all the R, G and B components are omitted to minimize the process time. However, in the data rearrangement, distortion is generated in the space array of the G component, and may increase computational error. To eliminate the array distortion, it is effective to execute an interpolating or thinning process on the sole G component.

As has been described in the foregoing, in this embodiment the first coding process is executed by omitting the color space conversion (i.e., YC conversion) process alone or both the color space conversion and pixel number conversion (i.e., interpolation) processes, and the image data stored in the frame memory unit 3, i.e., image data having color, i.e., R, G and B, spaces, is directly coded. It is thus possible to reduce the volume of data that is dealt with in the first coding process, which contributes to the speed increase of the coding process.

In addition, in the first coding process a predetermined initial scale factor is used for the computation of the ratio between the code volume of the resultant coded data and the target code volume, and according to this ratio the code volume control unit 8 switches the exponent n of power for the scale factor computation. Thus, it is possible to permit the coding process more adequately and storage or transmission of coded data which is less deteriorated.

While an example of code volume control with a two-pass computation process has been described above in detail, it is of course possible to make code volume control with a computation process of three or more passes by taking such design conditions as computational capacity specifications into considerations. Furthermore, various other arrangements are possible. For example, when it is estimated, as a result of the first coding in the above first coding process, that three or more passes will be involved due to excessive departure from the target code volume, the same process as the first coding, i.e., the first coding process, may also be executed for the second coding, and the above second coding process may be executed in the subsequent final (i.e., third or later) coding.

It is easily understandable that the present invention is applicable to other fields than the stated systems, such as general digital signal processing fields.

As has been described in the foregoing, according to the present invention it is possible to provide an image coding system, which permits the coding process to be executed more speedily and storing or transmitting adequate coded data with less deterioration even when the coding is made by code volume control of a plurality of passes.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An image coding system comprising an image pick-up unit for photoelectrically and then digital-to-analog converting image focused by an optical system, thereby providing digital image data, a color space/pixel number converting unit for converting the digital image data provided from the image pick-up unit to color space and pixel number converted digital image data to be stored and/or transmitted, an orthogonal converting unit for orthogonally converting the digital image data, a quantizing unit for quantizing orthogonal conversion coefficients provided from the orthogonal converting unit, a variable run length coding unit for variable run length coding the quantized orthogonal conversion coefficients from the quantizing unit, and a storing/transmitting unit for storing and/or transmitting the variable run length coded data from the variable run length coding unit, wherein:

the image coding system further comprises a code volume control unit for providing, in a first coding process, image data obtained from the color space/pixel number converting unit as a result of omission of at least the color space conversion, among the color space and pixel number conversions, to the orthogonal converting unit, and computing quantizing coefficient data adequate for obtaining a target code volume from the code volume of coded data provided from the orthogonal converting unit and the target code volume; and in a second coding process executed from an instant of time after the first coding process, the color space/pixel number converting unit executes both of the color space and pixel number conversions and provides resultant image data to the orthogonal converting unit and stores and/or transmitting the coded data provided as a result from the orthogonal converting unit.

2. An image coding system comprising an orthogonal converting unit for orthogonally converting digital image data, a quantizing unit for quantizing orthogonal conversion coefficients provided from the orthogonal converting unit, a variable run length coding unit for variable run length coding the quantized orthogonal conversion coefficients from the quantizing unit, and a storing/transmitting unit for storing and/or transmitting the variable run length coded data from the variable run length coding unit, wherein:

the quantizing unit quantizes the orthogonal conversion coefficients on the basis of quantizing coefficient data obtained by multiplying a basic quantization table by a scale factor;

the image coding system further comprises a code volume control unit for determining, in a first coding process, a scale factor used in a second coding process executed from an instant of time after the first coding process on the basis of the ratio between the actual code volume of coded data, obtained by using a predetermined initial scale factor, and a target code volume;

the coded data provided as a result of the second coding process is stored and/or transmitted.

3. An image coding system comprising an orthogonal converting unit for orthogonally converting digital image data, a quantizing unit for quantizing orthogonal conversion coefficients provided from the orthogonal converting unit, a variable run length coding unit for variable run length coding the quantized orthogonal conversion coefficients from the quantizing unit, and a storing/transmitting unit for storing and/or transmitting the variable run length coded data from the variable run length coding unit, wherein:

the quantizing unit quantizes the orthogonal conversion coefficients by using quantizing coefficient data obtained by multiplying a basic quantization table by a scale factor;

the image coding system further comprises a code volume control unit for computing, in a first coding process, a scale factor used in a second coding process executed from an instant of time after the first coding process by computing the ratio between the actual code volume obtained with a predetermined initial scale factor, and a target code volume, and then dividing the scale factor used in the first coding process by n-th (n being a positive integer) power of the ratio between the actual and target code volumes;

the coded data provided as a result of the second coding is stored and/or transmitted; and the code volume control unit computes the scale factor used in the second coding process by switching the exponent of the power according to the ratio between the actual and target code volumes.

4. An image coding system comprising an image pick-up unit for photoelectrically and then digital-to-analog converting image focused by an optical system, thereby providing digital image data, a color space/pixel number converting unit for converting the digital image data provided from the image pick-up unit to color space and pixel number converted digital image data to be stored and/or transmitted, an orthogonal converting unit for orthogonally converting the digital image data, a quantizing unit for quantizing orthogonal conversion coefficients provided from the orthogonal converting unit, and a variable run length coding unit for variable run length coding the quantized orthogonal conversion coefficients from the quantizing unit, wherein:

the image coding system further comprises a code volume control unit for providing, in a first coding process, image data obtained from the color space/pixel number converting unit as a result of omission of at least the color space conversion, among the color space and pixel number conversions, to the orthogonal converting unit, and computing quantizing coefficient data adequate for obtaining a target code volume from the code volume of coded data provided from the orthogonal converting unit and the target code volume; and in a second coding process executed from an instant of time after the first coding process, the color space/pixel number converting unit executes both of the color space and pixel number conversions and provides resultant image data to the orthogonal converting unit and stores and/or transmitting the coded data provided as a result from the orthogonal converting unit.

5. An image coding system comprising an orthogonal converting unit for orthogonally converting digital image data, a quantizing unit for quantizing orthogonal conversion coefficients provided from the orthogonal converting unit, and a variable run length coding unit for variable run length coding the quantized orthogonal conversion coefficients from the quantizing unit, wherein:

the quantizing unit quantizes the orthogonal conversion coefficients on the basis of quantizing coefficient data obtained by multiplying a basic quantization table by a scale factor;

the image coding system further comprises a code volume control unit for determining, in a first coding process, a scale factor used in a second coding process executed from an instant of time after the first coding process on the basis of the ratio between the actual code volume of coded data, obtained by using a predetermined initial scale factor, and a target code volume;

the coded data provided as a result of the second coding process is stored and/or transmitted.

6. An image coding system comprising an orthogonal converting unit for orthogonally converting digital image data, a quantizing unit for quantizing orthogonal conversion coefficients provided from the orthogonal converting unit, and a variable run length coding unit for variable run length coding the quantized orthogonal conversion coefficients from the quantizing unit, wherein:

the quantizing unit quantizes the orthogonal conversion coefficients by using quantizing coefficient data obtained by multiplying a basic quantization table by a scale factor;

the image coding system further comprises a code volume control unit for computing, in a first coding process, a scale factor used in a second coding process executed from an instant of time after the first coding process by computing the ratio between the actual code volume obtained with a predetermined initial scale factor, and a target code volume, and then dividing the scale factor used in the first coding process by n-th (n being a positive integer) power of the ratio between the actual and target code volumes;

the coded data provided as a result of the second coding is stored and/or transmitted; and the code volume control unit computes the scale factor used in the second coding process by switching the exponent of the power according to the ratio between the actual and target code volumes.

7. An image coding system for orthogonally converting the digital image data obtained by color space and/or pixel number conversion, quantizing the orthogonally converted coefficients and a variable run length coding the quantized orthogonally converted coefficients to produce coded data, wherein:

in a first coding process, image data obtained by the pixel number conversion is orthogonally converted, and quantizing coefficient data adequate for obtaining a target code volume is determined on the basis of the code volume of coded data provided by the orthogonal conversion and the target code volume; and in a second coding process executed from an instant of time after the first coding process, image data obtained by the color space and pixel number conversions is executed by the orthogonal conversion.

8. An image coding system for orthogonally converting digital image data, quantizing the orthogonal converted coefficients, and a variable run length coding the quantized orthogonal conversion coefficients, wherein:

the quantizing process is executed on the basis of quantizing coefficient data obtained by multiplying a basic quantization table by a scale factor; and in a first coding process, a scale factor used in a second coding process executed from an instant of time after the first coding process on the basis of the ratio between the actual code volume of coded data, obtained by using a predetermined initial scale factor, and a target code volume.

9. An image coding system for orthogonally converting digital image data, quantizing the orthogonal converted coefficients, and a variable run length coding the quantized orthogonal conversion coefficients, wherein:

the quantizing process is executed on the basis of quantizing coefficient data obtained by multiplying a basic quantization table by a scale factor;

in a first coding process, a scale factor used in a second coding process executed from an instant of time after the first coding process is computed on the basis the ratio between the actual code volume obtained with a predetermined initial scale factor, and a target code volume, and then dividing the scale factor used in the first coding process by n-th (n being a positive integer) power of the ratio between the actual and target code volumes; and the scale factor used in the second coding process is computed by switching the exponent of the power according to the ratio between the actual and target code volumes.

* * * * *